United States Patent [19]

Roscoe

[11] Patent Number: 5,533,193
[45] Date of Patent: Jul. 2, 1996

[54] METHOD OF SAVING MACHINE FAULT INFORMATION INCLUDING TRANSFERRING SAID INFORMATION TO ANOTHER MEMORY WHEN AN OCCURRENCE OF PREDETERMINED EVENTS OR FAULTS OF A REPRODUCTION MACHINE IS RECOGNIZED

[75] Inventor: Gary W. Roscoe, Fairport, N.Y.

[73] Assignee: Xerox Corporation, Stamford, Conn.

[21] Appl. No.: 264,884

[22] Filed: Jun. 24, 1994

[51] Int. Cl.⁶ .................................................. G06F 11/30
[52] U.S. Cl. .................. 395/183.15; 395/184.01; 395/185.01; 395/183.21; 371/21.6
[58] Field of Search .................. 395/183.15, 183.21, 395/184.01, 185.01; 371/21.6; 364/267.2, 266.6, 264.6, 264.7; 355/203, 204, 209

[56] References Cited

U.S. PATENT DOCUMENTS

| | | | |
|---|---|---|---|
| 4,996,688 | 2/1991 | Byers et al. | 395/183.21 |
| 5,007,020 | 4/1991 | Inskeep | 364/900 |
| 5,023,817 | 6/1991 | Au et al. | 364/550 |
| 5,125,088 | 6/1992 | Culley | 395/500 |
| 5,138,377 | 8/1992 | Smith et al. | 355/207 |
| 5,151,687 | 9/1992 | Younger | 304/706 |

Primary Examiner—Hoa T. Nguyen
Attorney, Agent, or Firm—Ronald F. Chapuran

[57] ABSTRACT

A technique for saving data related to given machine events in a control that normally records machine events or faults in a first-in, first-out buffer of finite size called an occurrence log by selectively setting the control to respond to the occurrence of a given machine fault or event, monitoring the operation of the machine for the occurrence of the given machine event, and initiating the transfer of the data in the buffer to a nonvolatile memory. Also included is the technique of delaying the transfer of the data in the buffer memory to the non-volatile memory until the recording of a given set number of events is determined in the buffer.

7 Claims, 12 Drawing Sheets

| FAULT LIST | | |
|---|---|---|
| CODE | RATE | STATE |
| 10-102 | 157 | Recov |
| 11-110 | 46 | Prod |
| 03-387 | 14328 | Idle |
| 10-108 | 52 | Prod |
| 11-224-1 | 246 | Recov |
| 09-220 | 10888 | Prod |
| 08-171 | 278 | Prod |
| 08-188-1 | 10023 | Recov |
| 08-100 | 59 | Prod |
| 08-155 | 16 | Recov |
| etc... | | etc... |
| | | |
| | | |
| | | |

| Last 50 Fault List | |
|---|---|
| CODE | RATE |
| 10-102 | 157 |
| 11-110 | 46 |
| 03-387 | 14328 |
| 10-108 | 52 |
| 11-224-1 | 246 |
| 09-220 | 10888 |
| *End of Log | |
| 08-171 | 278 |
| 08-188-1 | 10023 |
| 08-100 | 59 |
| 08-155 | 16 |
| etc... | |

Last to occurr (top) — First to occurr (bottom)

METHOD OF SAVING MACHINE FAULT INFORMATION INCLUDING TRANSFERRING SAID INFORMATION TO ANOTHER MEMORY WHEN AN OCCURRENCE OF PREDETERMINED EVENTS OR FAULTS OF A REPRODUCTION MACHINE IS RECOGNIZED

BACKGROUND OF THE INVENTION

The invention relates to a system for recording and displaying machine fault histories, and more particularly, to recording and displaying in memory both machine fault data as well as the state of the machine at the time of the fault.

As reproduction machines such as copiers and printers become more complex and versatile in the jobs they can do, the interface between the machine and the service rep must necessarily be expanded if full and efficient trouble shooting of the machine is to be realized. A suitable interface must not only provide the controls, displays, and fault histories necessary to monitor and maintain the machine, but must do so in an efficient, relatively simple, and straightforward way.

Diagnostic methods often require that a service rep perform an analysis of the problem. For example, problems with paper movement in a machine can occur in different locations and occur because of various machine conditions or failure of various components. In the prior art, this analysis by the service representative has been assisted by recording fault histories in the machine control to be available for readout and analysis. For example, U.S. Pat. No. 5,023,817 discloses a method for recording and displaying in a finite buffer, called a last 50 fault list, machine faults as well as fault trends or near fault conditions. This data is helpful in diagnosing a machine. It is also known in the prior art, in addition to the last 50 fault list, to provide a much larger data log, known as an occurrence log, to record a variety of machine events.

A difficulty, however, with the prior art is that the occurrence log or buffer is finite and generally records event data on a first-in first-out basis. Therefore, event data is eventually lost as it gives way to more current data. Thus, crucial data such as the occurrence of a specific event or fault, and the events or faults surrounding it, may not be available to the service representative to aid in analysis and diagnostics. Often this lost information can be of significant value to aid in diagnosing and servicing a machine.

It is a feature of the present invention to overcome the above and other related problems and to make easier the diagnosis and servicing of the machine. An object of the present invention, therefore, is to provide a technique to capture the occurrence log related to a particular machine fault or event. Another object of the present invention is to be able to trigger the transfer of the occurrence log to a non-volatile or permanent memory in relation to a predetermined machine event or fault. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with a technique for saving data related to given machine events in a control that normally records machine events or faults in a first-in, first-out buffer of finite size called an occurrence log by selectively setting the control to respond to the occurrence of a given machine fault or event, monitoring the operation of the machine for the occurrence of the given machine event, and initiating the transfer of the data in the buffer to a non-volatile memory. Also included is the technique of delaying the transfer of the data in the buffer memory to the non-volatile memory until the recording of a given set number of events in the buffer and also showing the time relationship of the occurrence log to other logs such as a last 50 fault list in the machine control, For a better understanding of the present invention, reference may be had to the accompanying drawings wherein the same reference numerals have been applied to like parts and wherein:

DETAILED DESCRIPTION OF THE PREFERRED EMBODIMENT

Figure 1:
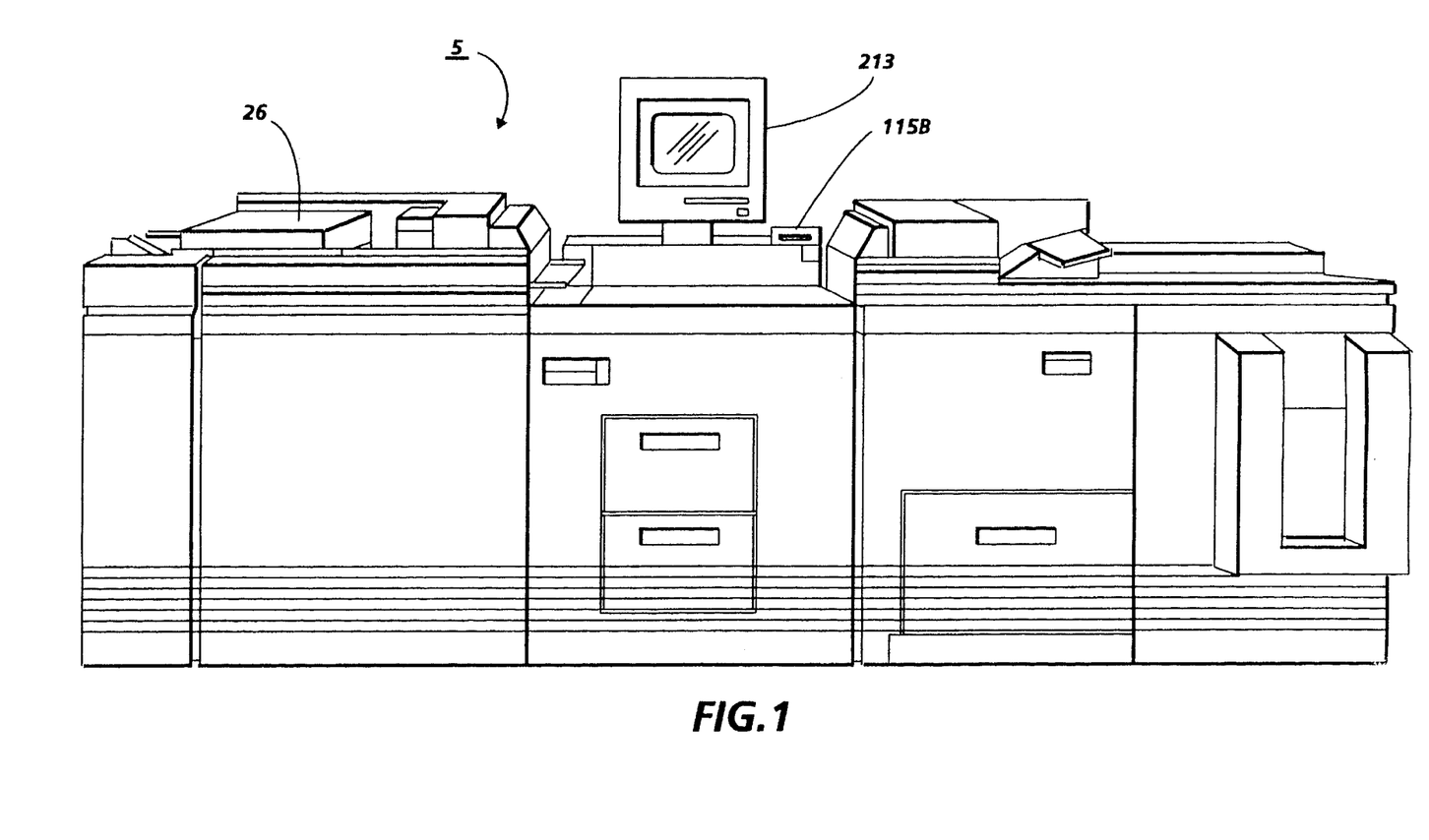
FIG. 1 is an isometric view of an illustrative reproduction machine incorporating the touch dialogue User Interface (U.I.) of the present invention.
Figure 2:
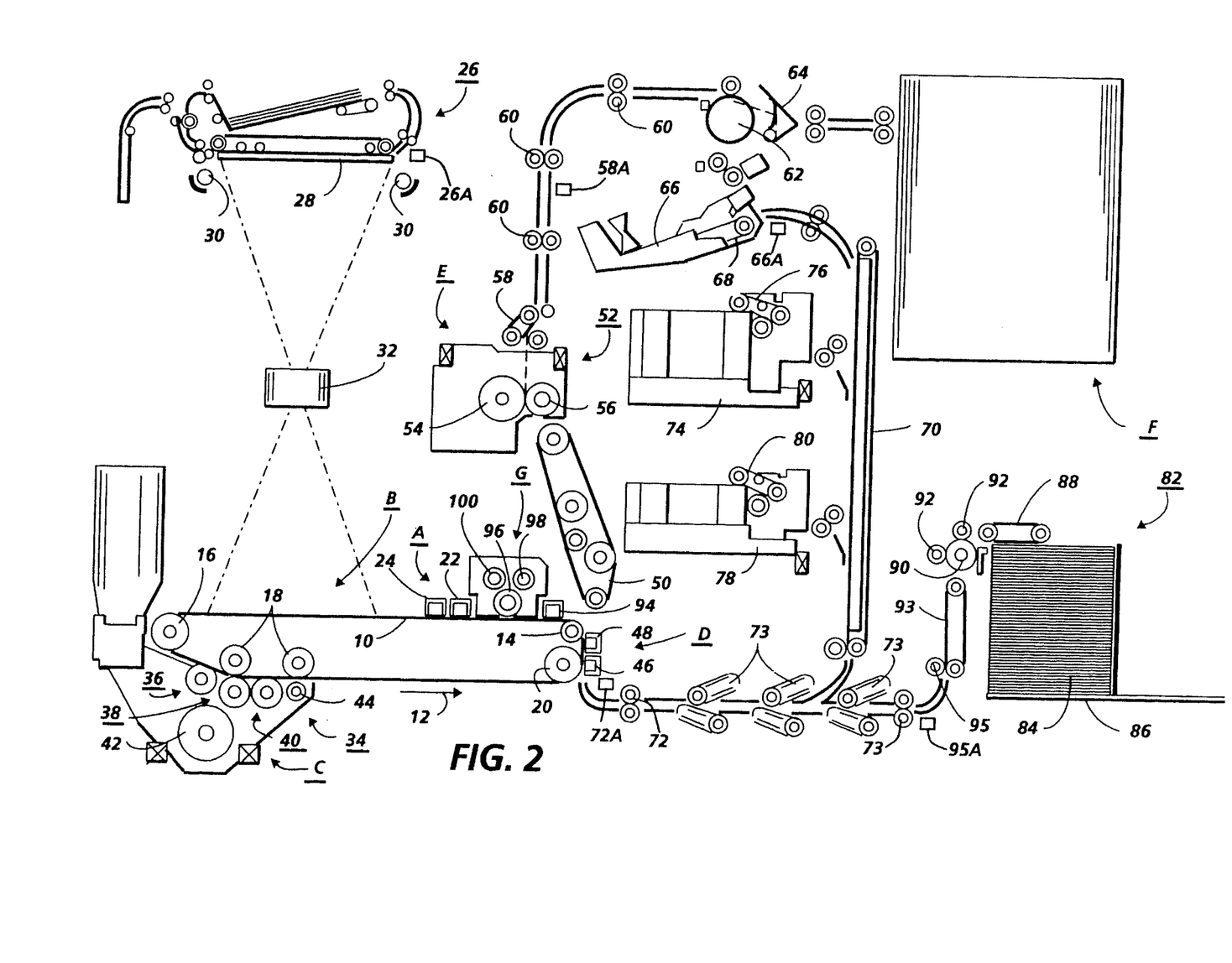
FIG. 2 is a schematic elevational view depicting various operating components and sub-systems of the machine shown in FIG. 1.

For a general understanding of the features of the present invention, reference is made to the drawings, In the drawings, like reference numerals have been used throughout to identify identical elements Referring to FIGS. 1 and 2, there is shown an electrophotographic reproduction machine 5 composed of a plurality of programmable components and sub-systems which cooperate to carry out the copying or printing job programmed through the touch dialogue User Interface (U.I.) of the present invention. It will become evident from the following discussion that the touch dialogue U.I. of the present invention may be employed in a wide variety of devices and is not specifically limited in its application to the particular embodiment depicted herein.

Machine 5 employs a photoconductive belt 10 with a drive roller 20 rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

Figure 3:
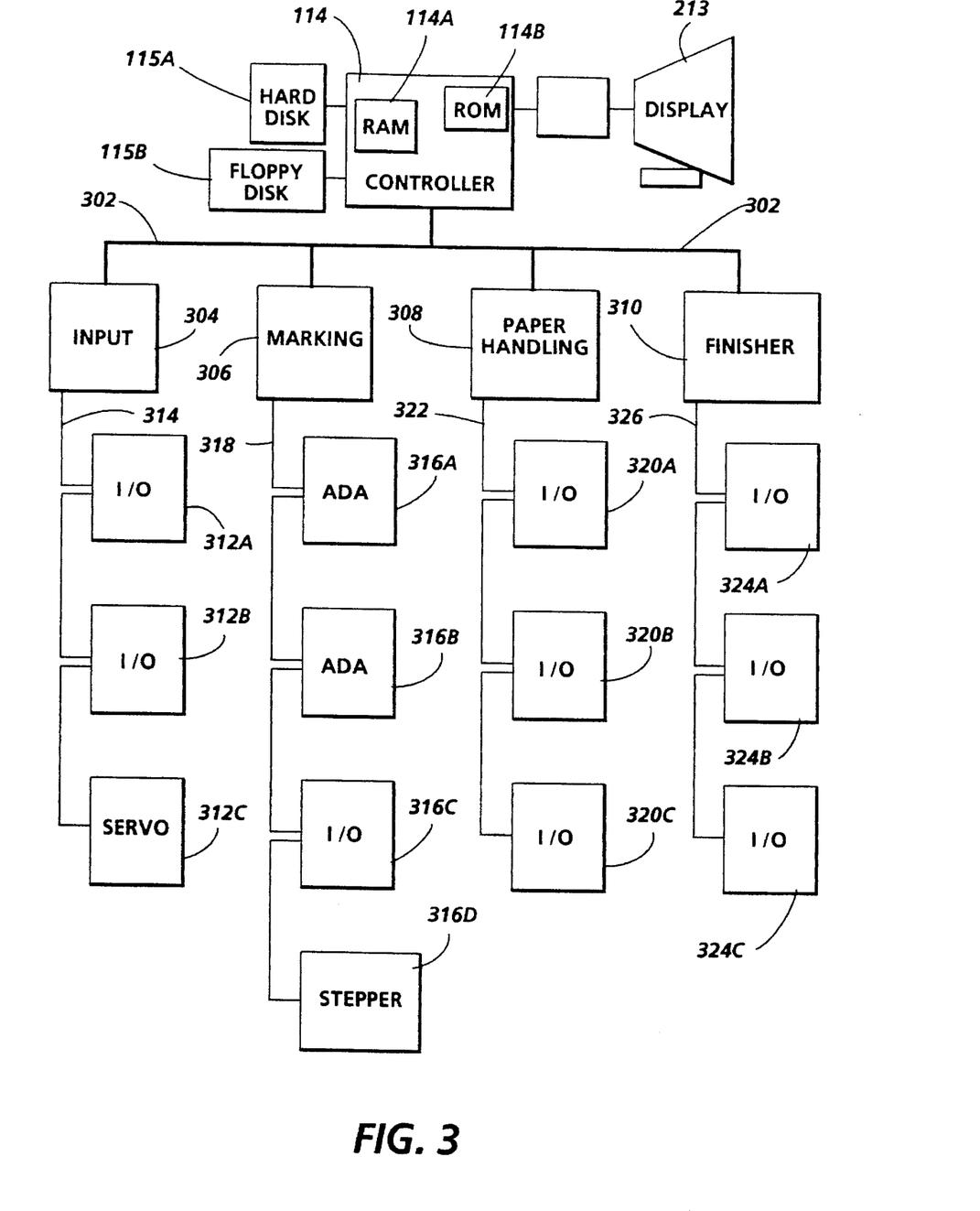
FIG. 3 is a block diagram of the operating control system and memory for the machine shown in FIG. 1.

With reference to FIG. 3, the various functions of machine 5 are regulated by a controller 114 which preferably comprises one or more programmable microprocessors. The controller provides a comparison count of the copy sheets, the number of documents being recirculated, the number of copy sheets selected by the operator, time delays, jam corrections, etc.. As will appear, programming and operating control over machine 5 is accomplished through a U.I. 213. Operating and control information, job programming instructions, etc. are stored in a suitable memory which includes both RAM 114A and ROM 114B, the former being also used to retain jobs programmed through U.I. (User Interface) 213. It should be understood that the memory 115 may comprise a series of discrete memories. Conventional document and sheet path sensors such as 26A, 58A, 66A, 72A, and 95A shown in FIG. 2 may be utilized to keep track of the position of the documents and the copy sheets. In addition, the controller regulates the various positions of the gates depending upon the mode of operation selected.

In one embodiment, the memory includes a hard or rigid disk drive 115A and a floppy disk drive 115B connected to Controller 114. Preferably, all of the control code and screen display information for the machine is loaded from the rigid disk at machine power up. Changing the data that gets loaded into the machine for execution can be done by exchanging the rigid disk in the machine 5 for another rigid disk with a different version of data or by modifying the contents of the current rigid disk by transferring data from one or more floppy disks onto the rigid disk using the floppy disk drive built into the machine 5. A suitable display of U.I. 213 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 4:
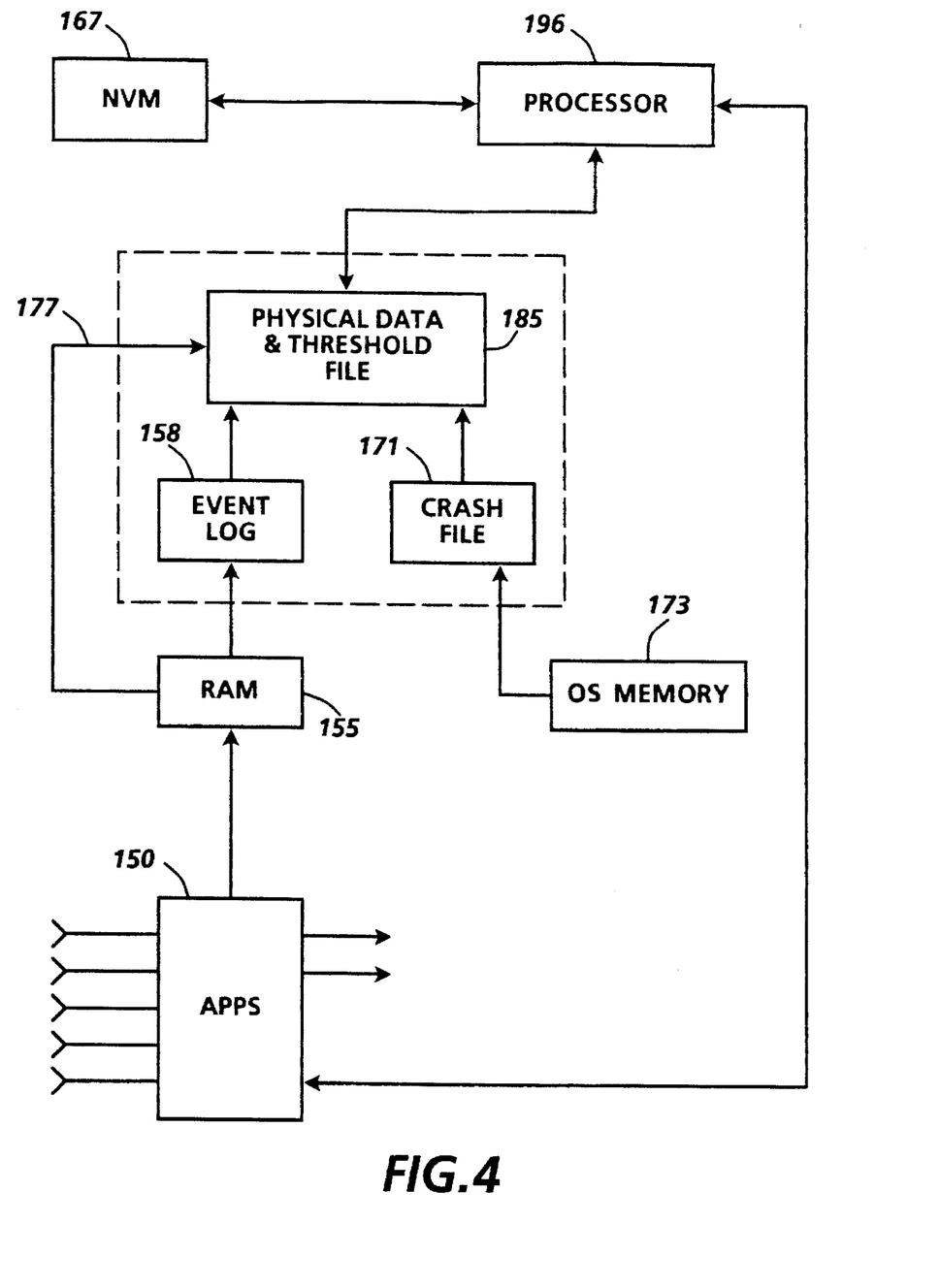
FIG. 4 is a general block diagram of the controller depicted in FIG. 3.

FIG. 4 illustrates in block form control elements of a typical controller such as shown in FIG. 3 at 114. Referring to FIG. 4, certain key machine operating events (such as current event data) which define the proper execution of the control system such as user interface buttons being set, changes in application software operating states, interlock switches opening and closing, notification of control or system faults, execution of key routines, etc., are input as they occur by the applications system 150 under control of processor 196 to dynamic memory (RAM) 155. Memory 155, which may be Random Access Memory or RAM type memory, preferably provides a (not shown) circular buffer of predetermined size for storing event data.

A data transfer means, an event spooling routine, periodically writes the event data accumulated in the buffer of memory 155 into an event or occurrence logger file 158 for transmission to the physical data and threshold file 185. Typically, the event spooling routine is repeated on a given cycle, i.e., after a present number of machine pitches. When called, the event spooling routine overwrites a portion of the previous event data stored in the event logger file 158 with the current event data, effectively erasing the previously oldest portion of the event data and replacing it with the newer current event data.

As will be understood, software crashes may occur from time to time during the life of the machine. In the case of most crashes, recovery is made either automatically or through the intervention of the operator, and machine 50 continues to operate normally. However, it is desirable to provide a record of the machine conditions at the time of the crash for use in diagnosing or servicing the machine. This is done by data logs recorded either at the machine or transmitted remotely to a host machine.

On each software crash, a snapshot is in effect taken of certain predetermined events (termed crash data) in the machine at the time the crash occurs. These events may, for example, consist of an image of each of the operating software (OS) memory maps illustrated as OS memory 173 and an image of NVM 167. Preferably, a snapshot of the current event data in the buffer of RAM 155 is included. The block of crash data obtained is fitted into one of a number of memory areas reserved for crash files in a crash logger file 171. Crash logger file 171 is a circular queue of crash files with the crash data from each succeeding crash written to the crash files in sequence.

Certain machine operating parameters such as photoreceptor belt charge levels, fuser temperatures, etc. are permanently stored in NVM 167. These parameters represent the optimum or ideal operational settings for the machine which will result in the best possible machine performance. Typically, these operating parameters provide an operating range or window.

Suitable sensors (not shown) such as an Electrostatic Voltmeter (ESV) for sensing photoreceptor charge levels, temperature sensors for sensing the operating temperatures of fuser 45, and sheet jam detectors as shown in FIG. 2 for detecting sheet jams and determining sheet timing, etc. monitor actual machine operating conditions. The physical data and threshold file 185 stores critical machine operating threshold levels for the machine operating components such as the photoreceptor belt charge levels, fuser temperatures, and bias control levels.

As discussed above various sensors and detectors monitor machine operating conditions and at discrete time during the operating cycle of the machine, these conditions are read and the data stored in the event logger file 158 and/or the crash logger file 171 to be stored in the physical data file 185 for evaluation. Thus, during the operating cycles of machine, the sensors such as the ESV, temperature sensors, and jam detectors, etc. are read and the data obtained input via line 177 to the machine physical data file 185. Also, any other suitable data for diagnostics, machine monitoring, or machine usage are suitably stored in the machine physical data file 185 or any other suitable memory for access at the machine by a service representative or stored for transmission to a remote location. For more detail of a typical control as described above, reference is made to U.S. Pat. Nos. 5,032,903; 5,138,377; and 5,218, 406 assigned to the same assignee as the present invention and incorporated herein.

Figure 5:
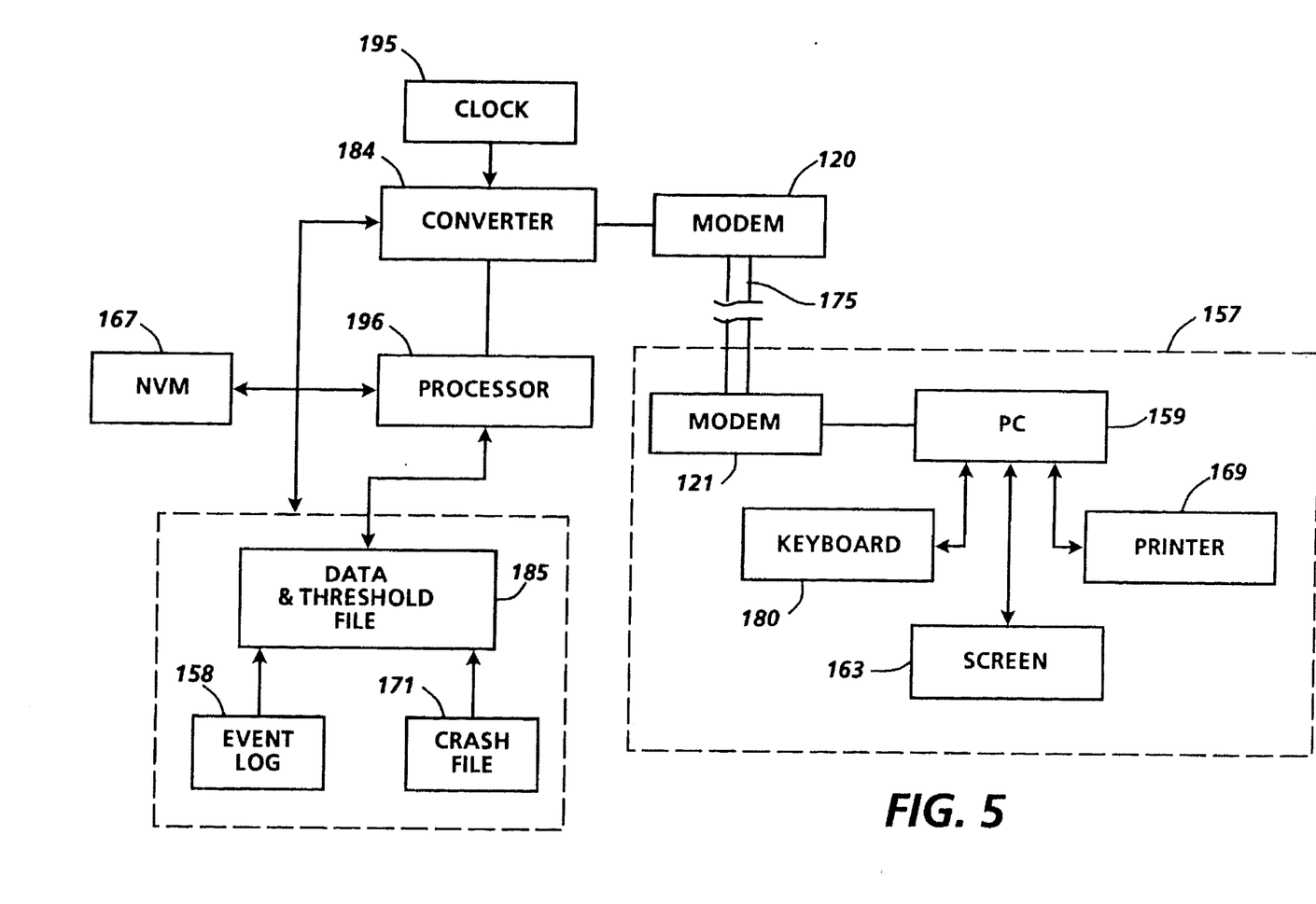
FIG. 5 is an illustration of the controller of FIG. 4 interconnected to a remote host station.

With reference to FIG. 5, there is shown a remote communication system including remote host 157 connected to machine 5 through a suitable channel such as telephone line 175 and modems 120,121 or any other suitable medium such as local and wide area networks, cellular phone channels, infrared links, and serial channels such as well known RS232 and SCSI serial ports. Selected machine data is downloaded to remote host 157 by communicating between the host 157 and memory in machine 5 such as Data and Threshold File 185. Communication can be initiated by either remote host 157 or machine 5. It should be noted that machine 5 and remote host 157 can be interconnected to other suitable stations or devices on a network or by any dedicated communication channel.

A computer such as PC 159 with keyboard 180, printer 168 and user interface with screen 163 is provided at the remote host 157 for use in establishing communication with modems 121, 120 for transmission of data from machine 5 via line 175 to host 157 and from host 157 to machine 5. A suitable data bandwidth converter 184 at machine 5 converts data to the clock rate required for transmission over line 175, it being understood that the rate at which data is handled by machine 5 is ordinarily different and typically substantially greater than the data transmission rate of telephone line 175. In this regard, a clock 195 is connected to converter 184. The clock 195 is used to determine frequency of testing the state of the machine for possible transfer of an alert. Similar, not shown converter and clock are provided with remote host 157.

Figure 6:
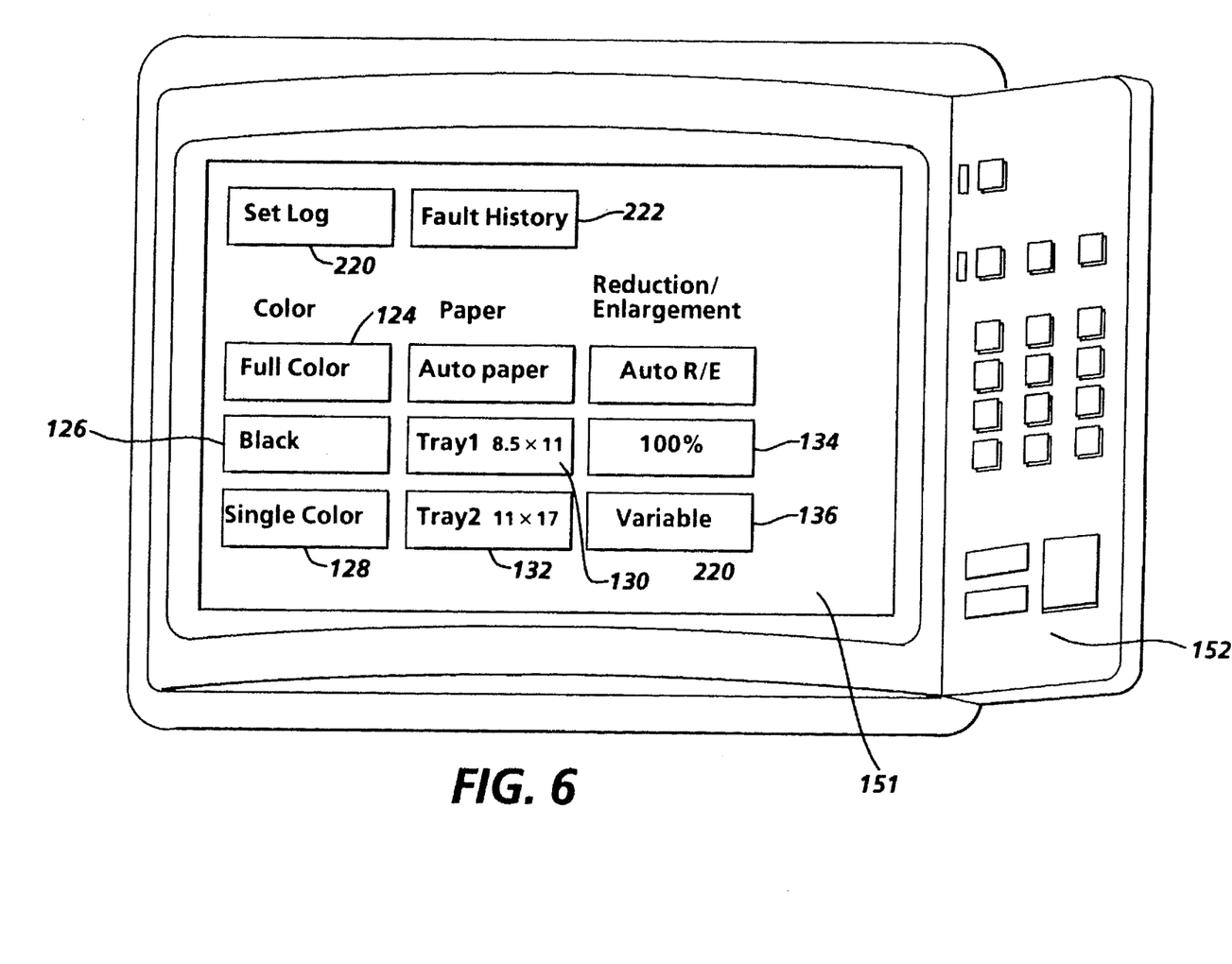
FIG. 6 is an exploded view of a typical user interface monitor screen shown in FIG.1.

FIG. 6 is merely a simplified version of the display unit 151, and hardware control panel 152 of the user interface 213 of machine 5 illustrating various soft control buttons such as full color 124, black 126, single color 128, tray 1 (130), tray 2 (132), and auto reduction/enlargement including 100% (134) and variable 136.

The machine operator, as is well known, is able to set up or program the next job or a future machine job as illustrated by the touch display unit 151 in FIG. 6. That is, by suitable selection of displayed features, a job can be programmed such as full color, black, or single color, or a particular size paper such as tray 1 containing 8.5×11" copy sheets or tray 2 containing 11"×17" copy sheets, or select a particular reduction/enlargement mode for example, 1009 or variable.

It should be understood that the display 157 of FIG. 6 is exemplary of typical display screens at user interfaces and that additional soft buttons can be displayed in the same frame or subsequent frames and can be selectively engaged by the operator or service representative. Also there can be a selection of suitable hard buttons shown on the panel 152, also available at keyboard 180 of host machine 157 for various operations and functions. For example, either hard or soft buttons can be used to select full size copies, 94% size copies, 77% size copies or any variable size copy as well as buttons to engage a recirculating document feeder to operate in a collate mode or non-collate mode. In addition, suitable buttons can enable the user or service representative to select, in a given machine environment, finisher operations such as stapled, non-stapled, non-collated, and such features as duplex copying and offset stacking and to perform various recording and diagnostic operations.

As known in the prior art, fault histories can be recorded and displ,ayed for use in machine diagnostics. The fault histories can include the number of actual faults of selected components as well as a computed rate of failure of components based upon actual failures as a function of opportunities to fail. For example, with reference to FIG. 7, there are shown component category selection buttons, generally identified at 238, such as Paper Handling Module (PHM) button 408 and Document Handling Module (DHM) button 409. Upon selection of a component category, a fault or failure table by specific component within the selected category is displayed as shown at 410. Assuming that the PHM button 408 has been selected, Table 410 will display the fault or jam history of various Paper Handling Module components. In one prior art embodiment, table 410 displays the code for as many as 15 components within the Document Handling Module and a history of the failure rate.

Figure 7:
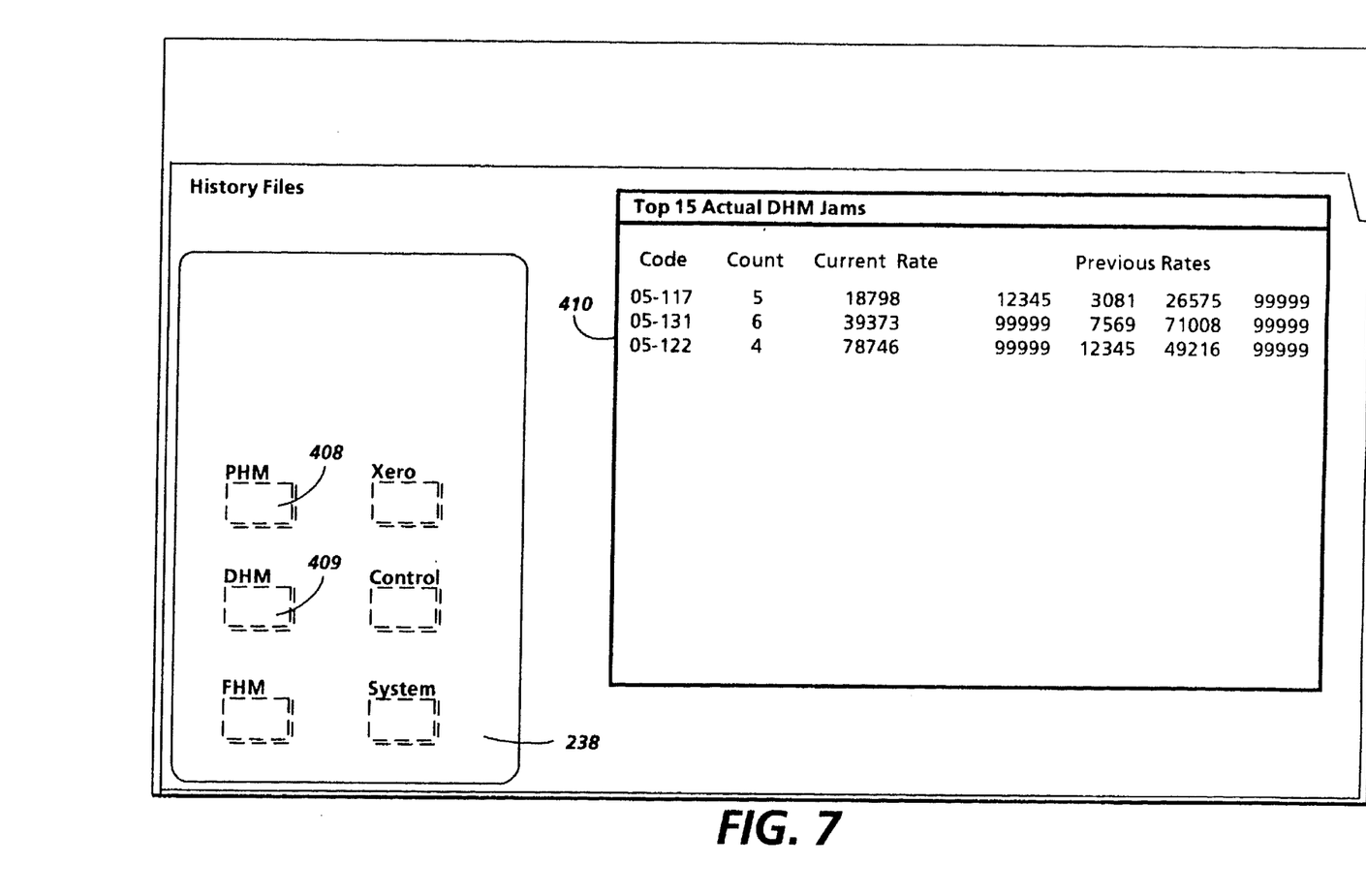
FIG. 7 ilustrates a screen for displaying machine faults.

With reference to table 410, there is a "code" column to identify various components with the Document Handling Module, a "count" column to record the number of actual faults or malfunction of that particular component since the last recording period, and a "current rate " column displaying the rate or ratio of actual failures to the total number of opportunities to fail. Opportunities to fail is defined as the total number of times that a particular components must respond over a period of time in the operation of the machine.

The column "Previous Rates " displays the history of failure ratios for the identified components. The history of failure rates is often a good indicator of the trend toward total failure of a particular component such as sensor or could indicate an adverse trend of components such as belts or pulleys. To review the fault rate history for actual faults, the initial step is to select fault tab 404 and a selected one of the component categories such as 408.

By way of example, Table 410 illustrates the actual fault history of three codes related to the Document Handling Module. The code 05-117 represents that the lead edge of the document is late to an inverter sensor during a document exchange. Code 05-131 represents that the lead edge of the document is late at pre-registration sensors, and Code 05-122 represents that there is an RDH set count error.

The fault history table is a dynamic table. When a fault occurs in relatiion to a particular component, a new rate of failure is immediately calculated within the system control for that particular component. That is, the ratio of the total number of faults to the total number of opportunities to fail is determined and stored in the current rate location. After a service call, the service rep enables a routine to reset the counters for counting the faults and to move the current rate to the most recent previous rate location in memory. For more details, reference is made to U.S. Pat. No. 5,023,817, assigned to the same assignee as the present invention, and incorporated herein.

In accordance with the present invention, there is recorded in the occurrence log relevant diagnostic data such as various states of the machine at the time of occurrence of a machine fault. This information is of significant value to aid in diagnosing and servicing a machine. For example, a jam recorded during machine cycle up might indicate the presence of a copy sheet from a previous job run. On the other hand, the same jam condition during a job run might indicate a particular sensor or component problem rather than a left over copy sheet. Thus there is illustrated a fault table for a given number of the most recently occurring faults in a finite store or buffer. In a preferred embodiment, the most recent 50 faults are recorded in a first-in first-out recirculating buffer. Various codes are shown representing machine faults directly related to machine components and the rate of occurrence of the fault. In particular, there is recorded for display the state of the machine at the time of fault.

Figure 8:
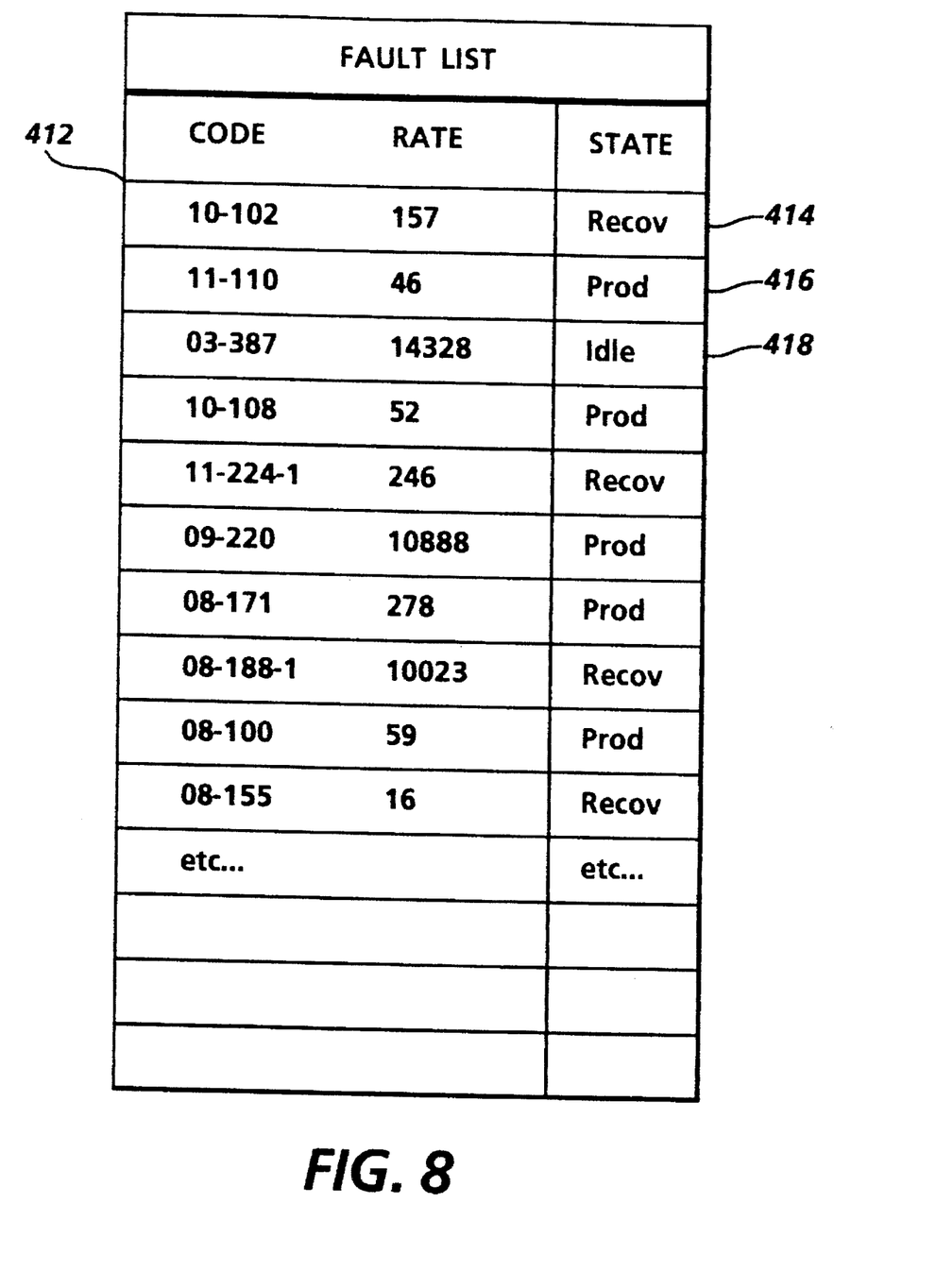
FIG. 8 illustrates a screen for displaying machine status along with machine faults in accordance with one feature of the present invention.

With reference to FIG. 8, there is generally disclosed a fault table 412 illustrating in 3 columns, codes representing faults, rates of failure, and the state of the machine at the time of the recording of the fault. It should be understood that the faults are represented by various codes as is well known in the prior art. It should also be understood that the rate could be a calculated percentage or could be indicated by a number representing the number of successful operations of a particular component before the recording of a fault. In accordance with the present invention, there is shown at 414, 416, and 418 indications of the state of the machine at the time of the recording of the fault. For example, fault code 10-102 occurred during the recovery of the machine. It should be understood that recovery could represent either a cycle up or a cycle down condition of the machine. In the alternative, this state could be further broken down and illustrated at either a cycle up or a cycle down condition.

Code 11-110 indicates a fault that occurred during the production or job run state of the machine and fault code 03-387 occurred during the idle or standby condition of the machine. In a similar manner various other faults are shown in the related state of the machine at the time of the occurrence of the fault. In one embodiment, a particular fault list the most recent fifty occurring faults in the machine. This is a design choice and it should be understood that various options concerning the size of the fault table are available. The key in the present invention is the recognition of the current state of the machine and recording in suitable memory the state of the machine at the time of the occurrence of the fault.

In addition to the last 50 fault list as discussed above, the controller 114 includes a much larger memory called the occurrence log. The occurrence log records a greater variety of machine events, also of value for diagnosing the machine. A difficulty with the prior art, as discussed above, is that the occurrence log or buffer, also being finite, generally records fault and event data on a first-in first-out basis. Therefore, fault and event data is eventually lost as it gives way to more current data. Thus, crucial data such as the occurrence of a specific event or fault, and the events or faults surrounding it, may not be available to the service representative to aid in analysis and diagnostics at the time the machine is being serviced.

Figure 9:
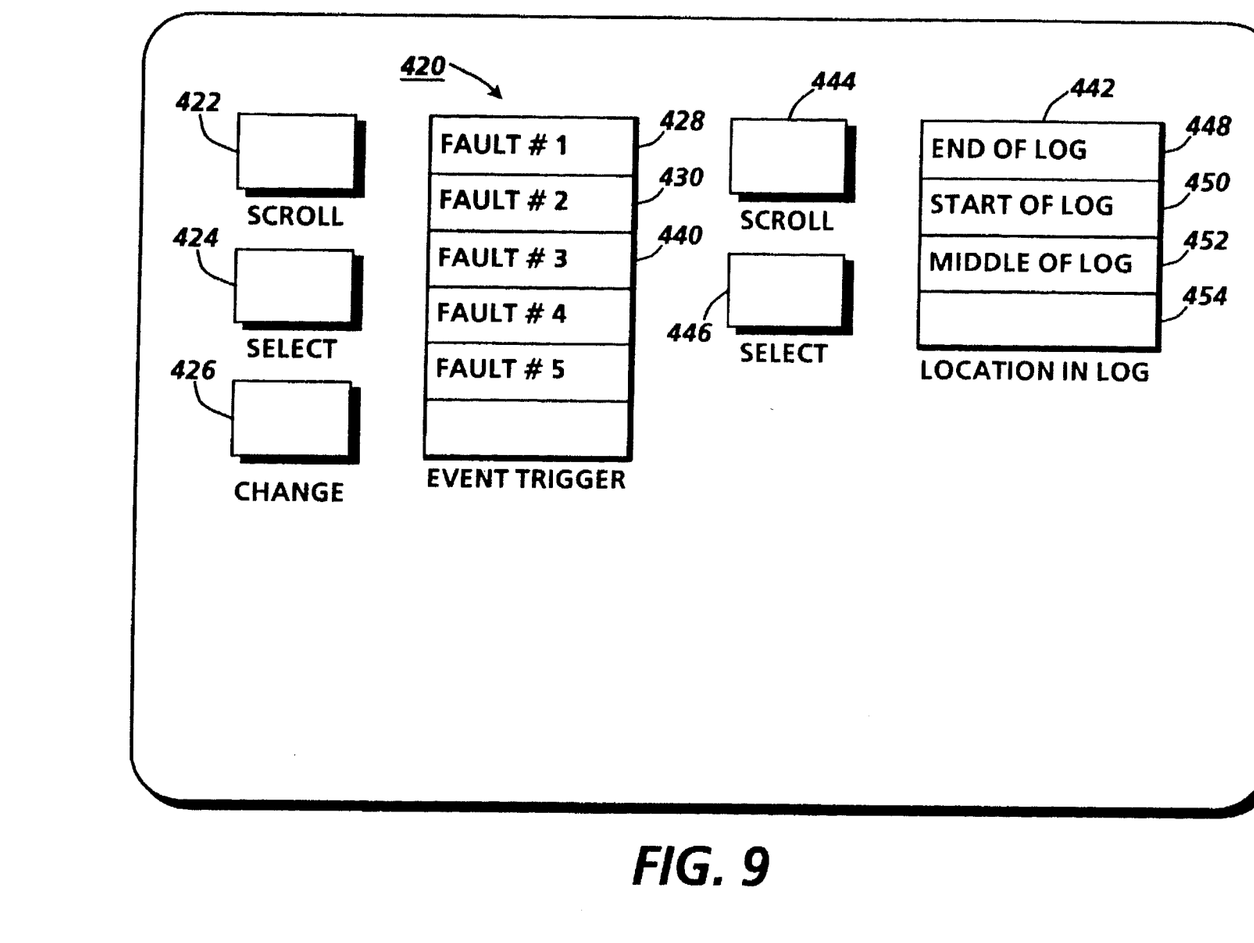
FIG. 9 illustrates setting an event to trigger the downloading of the fault occurrence log in accordance with another feature of the present invention.

In accordance with another feature of the present invention, the occurrence log related to a particular machine fault or event is captured before more current events erase this event history from the memory. That is, preselected events trigger the transfer of the occurrence log to a nonvolatile or permanent memory. For example, The contents of the occurrence log can be suitably downloaded or dumped into a permanent memory such as a disk memory resident in the control of the machine. With reference to FIG. 9, there is shown a table or window 420 listing several faults or events such as fault 1 shown at 428, fault 2 shown at 430, and fault 3 shown at 440. Table 420 is an event or fault trigger table that enables the operator through the use of a scroll button 422 and select button 424 to set a predetermined fault or event. Thew selection of an event will cause the transfer of the occurrence log to a permanent memory.

It should be understood that this transfer could be to a permanent memory such as a disk 115A or 115B within the machine or any other suitable memory within the machine, or could be transmitted remotely to a host machine or station. For example, with reference. to FIG. 5, the occurrence log, including the preselected event or fault in a given number of related events in the occurrence log, could be stored in the the data and threshold file 185 for transmission to the remote station 157. The occurrence log could be stored in a suitable location in the data threshold file for immediate transmission over the transmission line 175 to PC 159 or temporarily stored in data and threshold file 185 until periodic intervals, or upon polling from the host station 157. In the alternative, the log stored in the data and threshold file 185 could be transferred to nonvolatile memory 167 or onto a suitable disk memory such as floppy disk 115B illustrated in FIGS. 1 and 3.

The particular event or fault to trigger the transfer of the occurrence log is selected by scrolling though a predetermined event or fault list that is displayed in window 420. Upon finding the desired event or fault in the window or table 420 using the scrolling button 422, the operator then selects the particular fault or faults using the select button 424. It is a mere design choice to identify the fault to be selected by location such as the top position 428 or by use of well known high lighting techniques to manifest the fault or event that will be selected by the activation of the select button 424. It should be understood that there are many variations of the above described techniques for selecting an event or fault to trigger the occurrence transfer and that the scope of the present invention is intended to cover all such variations. Such variations could include a change button 426 that allows the operator using the keyboard 152 shown in FIG. 6 to enter additional events or faults in place of the existing events or faults in table 420. For example, since the table 420 is a finite list, it may be desirable to be able to select other events or faults. By suitably high lighting a fault to be changed, such as fault 1, and activating the change button 426 the operator can enter a new fault or event to trigger the occurrence log transfer.

In accordance with another feature of the present invention, the location of the fault or event within the occurrence log can be selected. In other words, once the selected event or fault occurs, since the occurrence log itself is finite, it may be desirable to selectively position the event within the log. In other words, after the event occur, it may be desirable to have the occurrence log include only events occurring after the preselected event, include only events occurring before the preselected event, or have any other selected relationship of the preselected event to the remaining events appearing in the occurrence log. Since the occurrence log is finite, the operator can select the placement of the preselected event to trigger the transfer within that finite set of events. Thus, with reference to FIG. 9, there is shown a window or table 442 with possible location in log selections. Thus, 448 would be the end of the log, at 450 a start of the log location, and 452 a middle of the log location. As described with reference to the event trigger, a scroll button 444 can scroll various options in the window 442 and the select button 446 operates to select a particular location. Various other options are well within the scope of the present invention, in particular, a blank window such as window 454 could be used to enter from the interface keyboard a specific location. For example, the operator could add a particular number for the placement of the preselected event in the log that triggers the downloading or transfer to the permanent memory.

Figure 10:
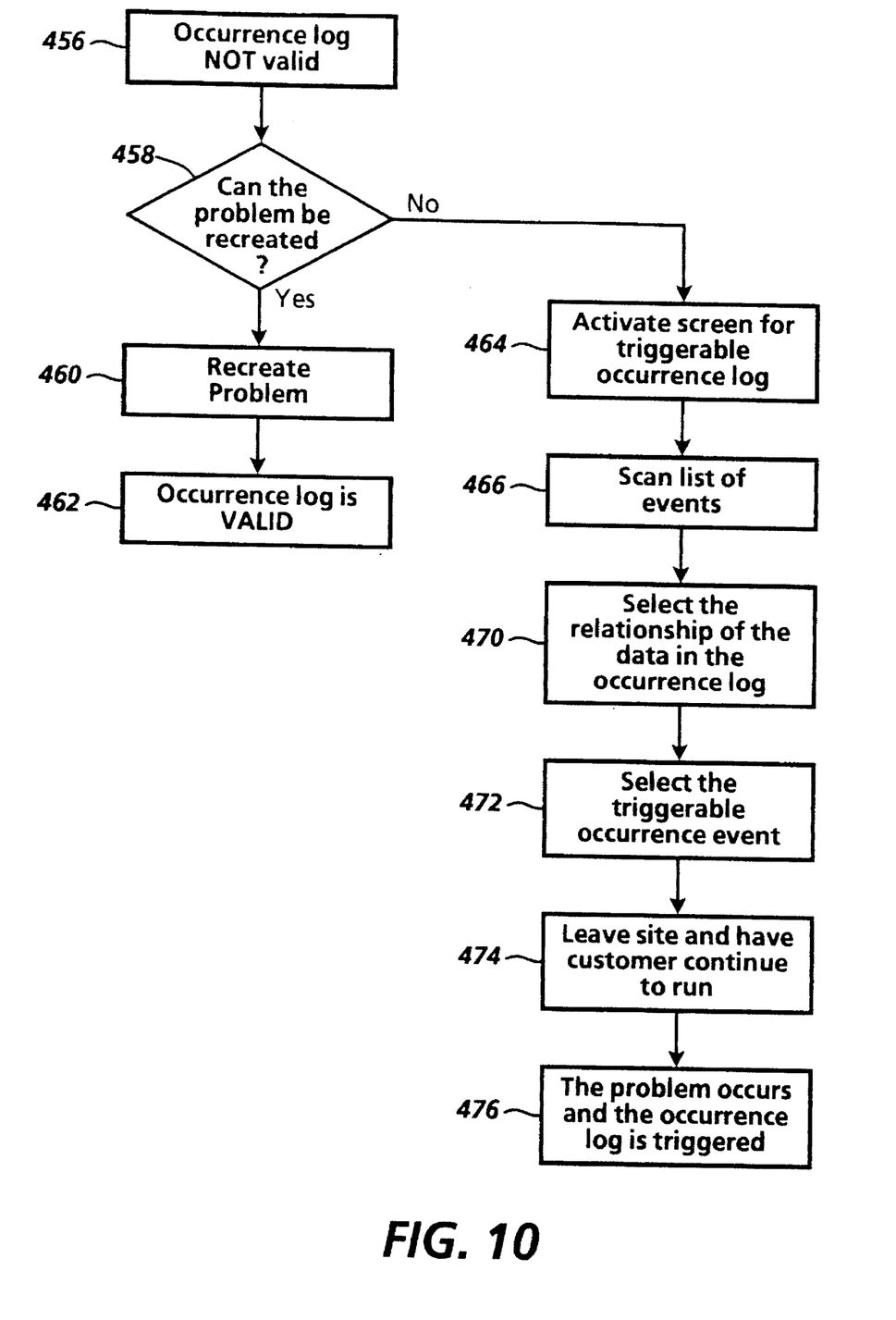
FIG. 10 is a flow chart illustrating setting up a triggerable occurrence log in accordance with the present invention.

A general flow chart of this pre-selection is illustrated in FIG. 10. At block 456, a service representative determines that the occurrence log that is displayed is not valid. That is, it does not provide the appropriate information related to a given fault or faults. In a typical diagnostic scenario, a service representative, as illustrated at block 458, first attempts to recreate the problem for diagnosis. If the problem can be recreated, this is illustrated at block 460. That is, the service representative can run the machine while present and obtain valid data.

On the other hand, if the problem can not be recreated for immediate analysis, it is necessary to set up an occurrence log with the appropriate event or fault to trigger the transfer of the occurrence log to permanent memory. This of course, will enable the appropriate occurrence log to be captured before succeeding events obliterate or wipe out the needed fault or event history related to the selected event. Thus, as illustrated at 464, the operator or service representative will activate the appropriate screen for setting up the occurrence log. This can be any suitable button such as set log button 220 shown in FIG. 6. Button 222 the fault history button is a means for displaying the recorded fault history, that is, the last 50 fault list shown in FIG. 8. Upon activating the suitable screen, illustrated in FIG. 9 described above, the service rep scans the list of events and selects the appropriate fault as illustrated at 456. At 470, as described above, the service rep will select the suitable relationship in the occurrernce log. In other words, the service rep will use scroll switch 444, select switch 446 and the table 442 to locate the event in the occurrence log. The, selection of the triggerable occurrence event is illustrated at 472. Block 474 merely illustrates that the service representative has left the machine site and the machine continues to run various job requirements. At block 476, there is an illustration of the problem occurring in the machine which in turn triggers the downloading of the occurrence log.

Figure 11:
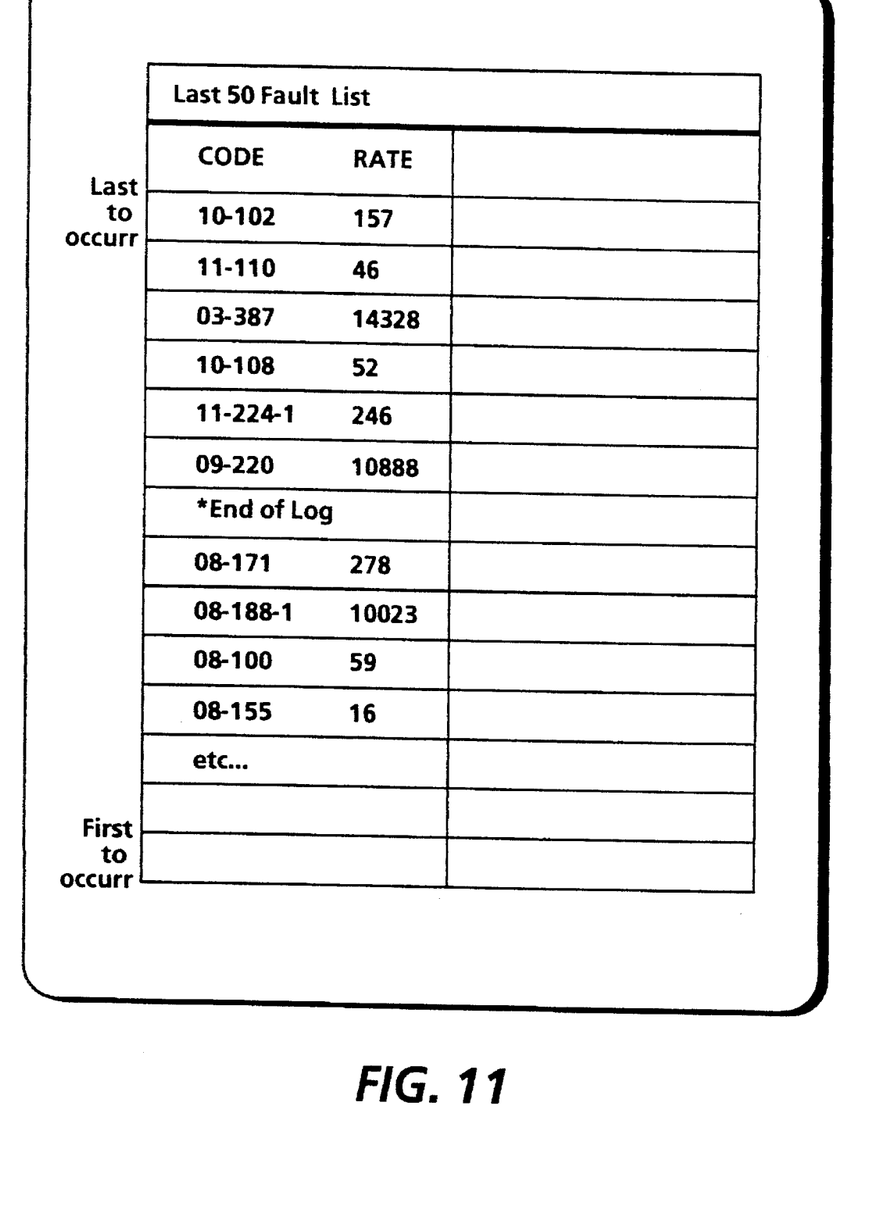
FIG. 11 illustrates and end of log indicator on fault list in accordance with another feature of the present invention.

In accordance with another feature of the present invention, a tech rep is able to determine in relation to the fault history or last fifty fault list, the relationship of the end of the occurrence log. In other words, the key information for a tech rep has often rolled off the occurrence log. Therefore, for the tech rep it is important to know in relation to the last fifty fault list where the end of the occurrence log is. This allows the tech rep to immediately determine whether or not the occurrence log taken will have the necessary information to solve a particular problem. If not the tech rep will need to take an occurrence log at a later date. For example, with reference to FIG. 11, assume that the tech rep is concerned with an 8-155 fault as illustrated in the table. As listed, the 09-220 is the oldest fault that was captured by the occurrence log. Any faults after the "end of log" entry would not be in the log. Knowing this the tech rep can determine that any occurrence log taken at this time would probably not be helpful and that a triggerable occurrence log should be set up to capture the particular fault or event in question.

Figure 12:
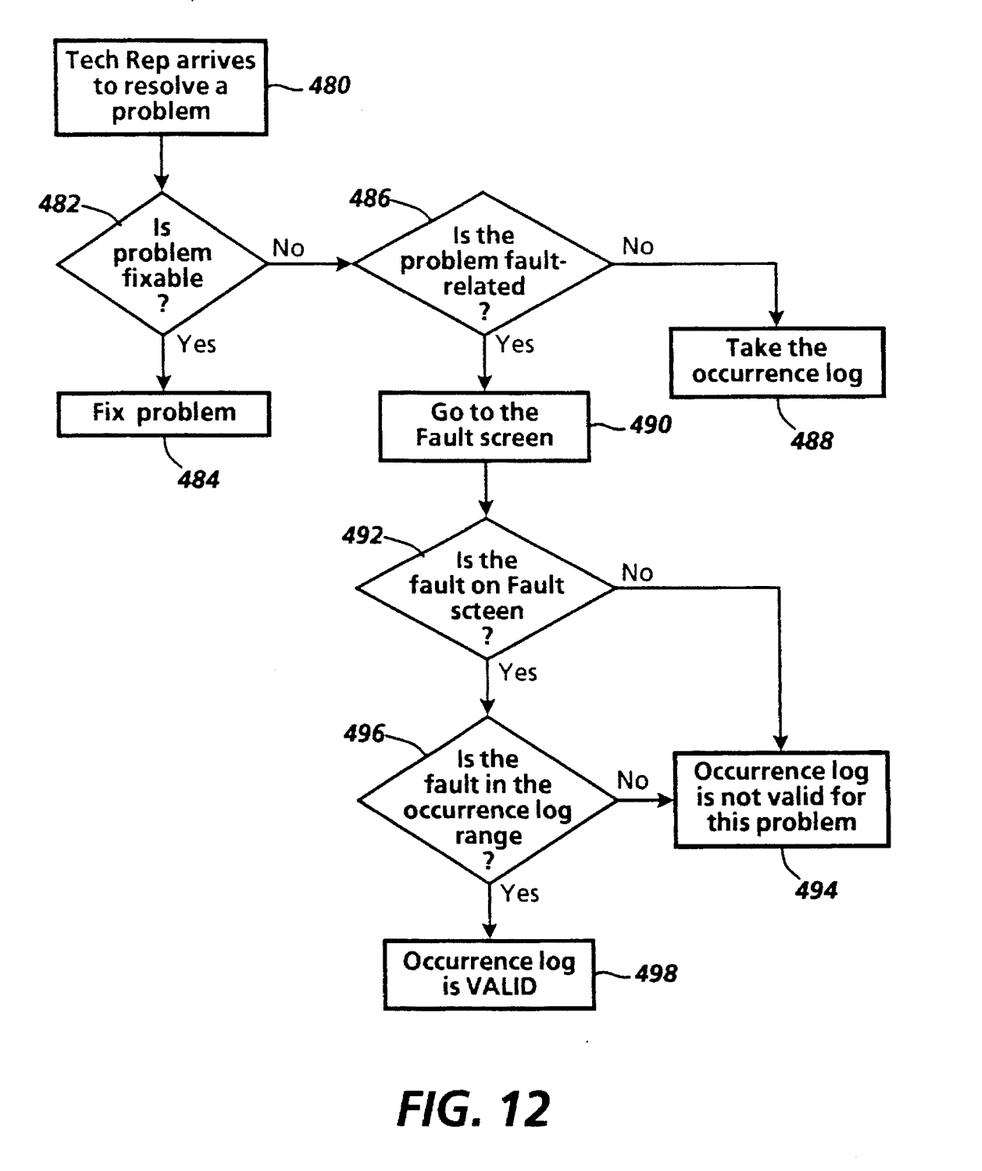
FIGS. 12 is a flow chart illustrating the determination of whether occurrence log data is valid in accordance with the present invention.

With reference to the flowchart, FIG. 12, this feature is shown. At block 480, and 482, the tech rep determines whether or not the problem is solvable. If so, the problem is fixed as illustrated at 484. If the problem is not fixable, in the first step of diagnostics, the tech rep determines if the problem is fault related. If not an occurrence log may not be necessary, although often the service rep will set up a trigger for an occurrence log anyway as shown at block 488. If the problem is fault related, at block 490 the tech rep displays the fault table such as the last fifty faults on the screen. In block 492 the service rep determines whether or not the fault that is the problem is on the last fifty fault list. This is shown in relation to the "end of log" designation on the last fifty fault lists. If the fault is in the occurrence log range, then the occurrence log is valid and the log data can be useful in analyzing the problem as illustrated at block 496. If on the other hand, the fault is not in the occurrence log range or on the last fifty faults list, the occurrence log is not valid for this particular problem as illustrated at block 494.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. A method of storing machine fault information including information indicating an occurrence of predetermined events in a reproduction machine having a plurality of components including a control with a first memory and a second memory, said method comprising the steps of:

setting the control to respond to an occurrence of a predetermined event;

setting said reproduction machine in a normal operation mode:

capturing information on current faults and events of the reproduction machine and storing said data in the first memory;

monitoring the operation of the machine in relation to said setting the control for the occurrence of the predetermined event; and upon recognizing the occurrence of the predetermined event, initiating a transfer of the information in the first memory to the second memory.

2. The method of claim 1 wherein the second memory is a nonvolatile memory.

3. The method of claim 1 wherein the second memory is a a disc memory.

4. The method of claim 1 wherein the step of initiating the transfer of data including the step of delaying the transfer of data until a predetermined number of events, after the occurrence of the predetermined event, is determined by the control.

5. A method of storing machine fault information in a reproduction machine having a plurality of components including a control with an first memory for recording events and faults, a second memory, and an operator console, said method comprising the steps of:

setting the control using the operator console to respond to an occurence of a predermined fault or a predetermined event;

setting said reproduction machine in a normal operastion mode:

capturing information on current events and faults of the reproduction machine and storing said information in the first memory;

monitoring the operation of the machine for the occurrence of the predetermined fault or the predetermined event; and upon recognizing the occurence of the predetermined fault or the predetermined event, initiating the transfer of the information in the first memory to the second memory.

6. The method of claim 5 wherein the step of setting the control using the operator console includes the step of displaying a set of perdetermined events or predetermined faults for selection by an operator on a display screen.

7. The method of claim 5 wherein the step of initiating the transfer of the data in the first memory to the second memory includes the step of delaying the transfer until a predetermined number of faults in the first memory is determined by the control.

\* \* \* \* \*